Aug. 28, 1923.
R. S. JACOBSEN
RECIPROCATING SCREEN OR CONVEYER
Filed May 26, 1921
1,465,942
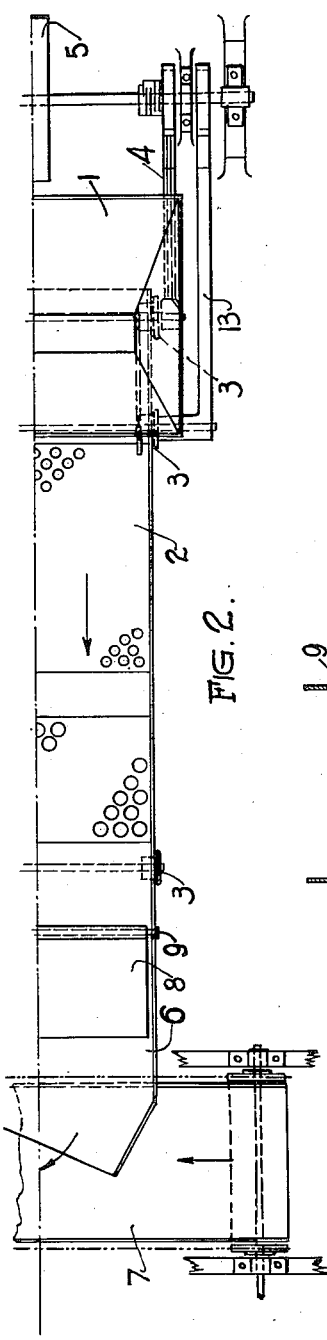
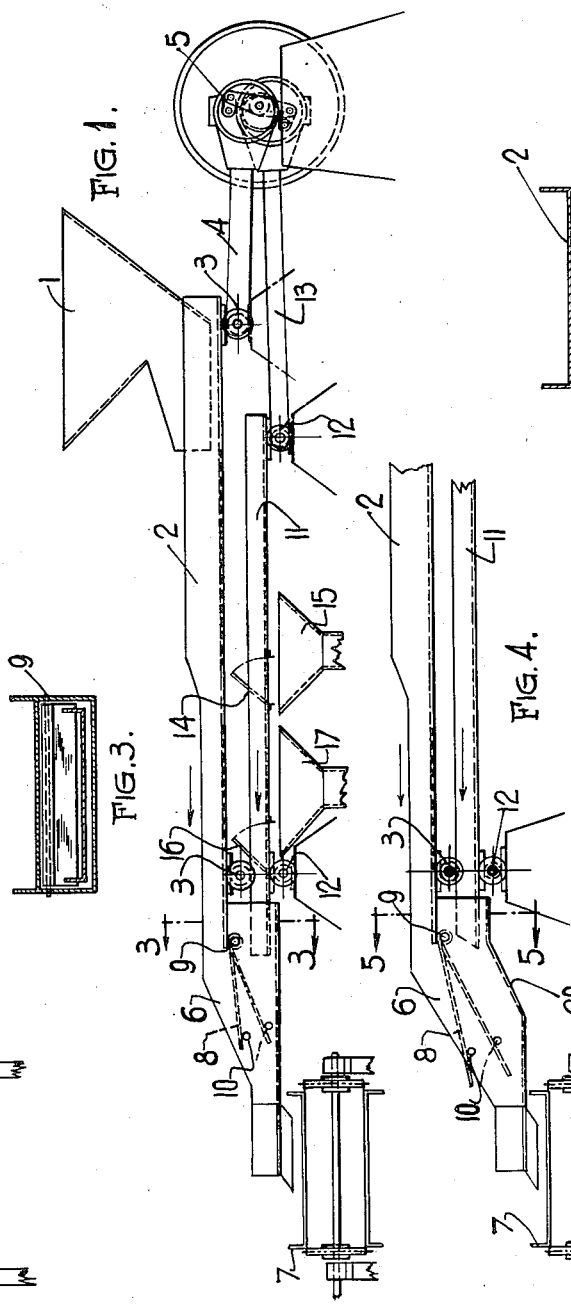
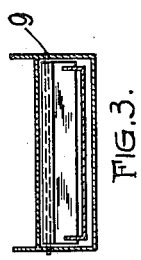
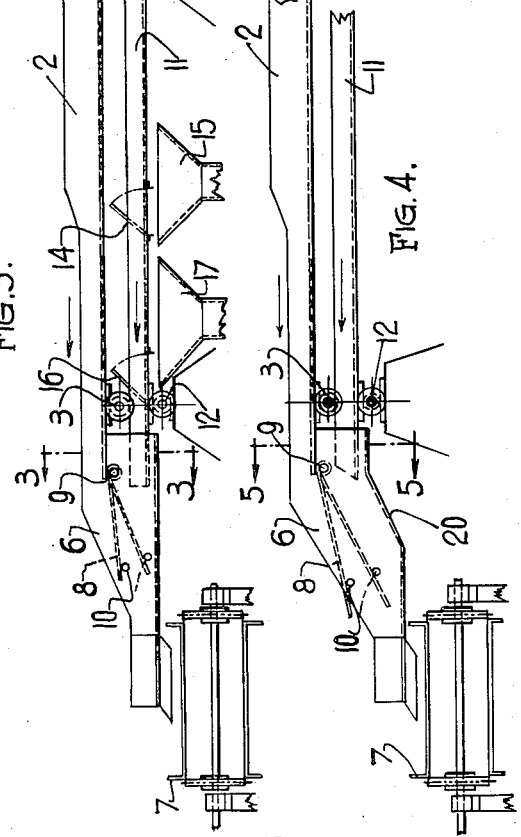
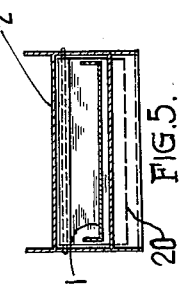
INVENTOR
Richard S Jacobsen
BY
Frank J Schraeder Jr
Attorney Patented Aug. 28, 1923.

1,465,942

UNITED STATES PATENT OFFICE.

RICHARD S. JACOBSEN, OF CHICAGO, ILLINOIS, ASSIGNOR, BY MESNE ASSIGNMENTS, TO WEBSTER MFG. CO., A CORPORATION.

RECIPROCATING SCREEN OR CONVEYER.

Application filed May 26, 1921. Serial No. 472,772.

*To all whom it may concern:*

Be it known that I, RICHARD S. JACOBSEN, a citizen of the United States, residing at Chicago, in the county of Cook and State of Illinois, have invented a new and useful Improvement in Reciprocating Screens or Conveyers, of which the following is a specification.

The invention relates to conveyers and especially screen conveyers whereby material is screened and conveyed to a desired destination.

In conveyers where a screen receives the material and is arranged above a trough, the screen and trough executing a reciprocating motion, the discharge end of the trough is so arranged with respect to the corresponding end of the screen that the material from the trough engages the screen whereby the progressive travel of the material is retarded if not entirely stopped resulting in improper operation and breakage of the material.

It therefore constitutes an object of the invention to provide a conveyer including a screen and trough where the conveyance of the material by the trough is not hampered by the screen.

A further object aims at providing the screen with a discharge end designed to preclude interference with the material discharged from the trough.

A still further object aims at providing the screen with adjustable means at the discharge end so that proper adjustment for the discharge thereof may be made to obtain proper operation of the conveyer.

With these and other objects in view which will hereinafter appear the invention is described in the following specification, particularly pointed out in the claims, and illustrated in the accompanying drawing, in which—

Fig. 1 is a side elevation of the conveyer.

Fig. 2 is a fragmentary top plan view.

Fig. 3 is a section on line 3—3 of Fig. 1.

Fig. 4 illustrates a fragmentary side elevation of a modification, and

Fig. 5 is a section in line 5—5 of Fig. 4.

Referring to the drawing 1 designates a hopper in which the material is received and from which it is discharged. Underneath the hopper a screen 2 is arranged for reciprocating movement on rollers 3, 3 and receives motion through a connecting rod 4 from a drive generally designated by 5. The drive per se forms the subject matter of Letters Patent 1,289,791 issued to me December 31, 1918, so that further reference may be had thereto for its construction and operation.

However, it may be briefly stated, that by virtue of this drive a reciprocating motion is obtained wherein the forward and backward strokes of each revolution, respectively, progressively increase and diminish in speed for the greater part of their travel, i. e., approximately two-thirds of the stroke, the last third being utilized in reversing and thereby reducing the shock which would occur in a sudden reversal. The screen 2 has sieves of different mesh for the screening of slack and nut coal, if the apparatus is used for coal conveyance, and the screen also serves as a picking table as will be readily understood at the remote or discharge end of the screen, or if preferred it may be formed separate and secured thereto. The trough 6 is provided with a discharge chute delivering the material onto an apron conveyer 7 which transports the picked material to its destination. The screen 2 has hingedly secured to its free end a plate 8, the hinge pintle 9 being arranged in the side walls of the trough 6. A pin 10 secures the plate 8 in selective position, to which end the trough wall has a plurality of perforations permitting the introduction of the pin. Underneath the screen a trough 11 is provided and is also reciprocated on rollers from the drive 5 by a connecting rod 13.

The trough 11 is equipped with a gate 14 which covers an opening in the trough to permit the discharge of slack coal into a hopper 15 underneath said opening. A second gate 16 removed from the gate 14 permits the discharge of nut coal into a hopper 17. Normally, however, the two gates are closed so that the material which passes from the screen to the trough is carried therealong for discharge.

Attention is called to the fact that the material when being discharged from the trough 11 does not come in contact with the appertaining end of the screen, nor with the material discharged therefrom, because the screen equipped with the plate 8, discharges at a place removed from the discharge end of trough 11 precluding thereby interference, and breakage of material and also preventing retardation of the travel of the material by reason of such interference The operation of the conveyer will be readily understood: The material discharged onto the screen 2 will partly be conveyed thereon, and partly fall into the trough for conveyance therein. The screen 2 will discharge the lump coal into the trough 6 and thence onto the apron conveyer 7, whereas the trough 11 will convey either the slack or the nut coal or both, depending on the adjustment of the gates 14, 16, so that the smaller size material will finally also be discharged into the trough 6 but removed from the discharge end of the screen and ultimately will reach the apron conveyer for final delivery.

The modification shown in Figs. 4 and 5 is similar in all respects to the previously described embodiment except that the trough 6' is formed with an inclined bottom wall 20 to utilize gravity discharge for the material conveyed by the trough 11.

While the drawings disclose preferred embodiments of the invention, they are merely representative of the various ways in which the invention may be carried out.

I therefore do not limit myself to constructional details or precise features of arrangement, but claim my invention as broadly as the state of the art permits.

I claim:

1. In a conveyer system, a horizontally reciprocating screen, a horizontally reciprocating trough arranged therebeneath and conveying the material in the same direction as said screen and for mixing with the discharge thereof, means for actuating said screen and trough, and adjustable means for causing said screen to discharge at a place removed from the discharge end of said trough.

2. In a conveyer system, a horizontally reciprocating screen, a horizontally reciprocating trough arranged therebeneath and conveying the material in the same direction as said screen and for mixing with the discharge thereof, means for actuating said screen and trough, means for causing said screen to discharge at a place removed from the discharge end of said trough, and means integral with said screen for conveying the discharge from said screen and trough.

3. In a conveyer system, a horizontally reciprocating screen, a horizontally reciprocating trough arranged therebeneath and adapted to receive screenings for conveyance, means integral with said screen for conveying the materials discharged from said screen and trough, and adjustable means for preventing interference of the materials when discharged into said integral means.

4. In a conveyer system, a horizontally reciprocating screen terminating in a depending trough, a horizontally reciprocating trough arranged under said screen and extending into said first named trough, and adjustable means for deflecting the discharge from said screen into said depending trough to prevent interference with the discharge from said reciprocating trough.

5. In a conveyer system, a horizontally reciprocating screen terminating in a depending trough, a horizontally reciprocating trough arranged under said screen and extending into said first named trough, and means hingedly arranged at the discharge end of said screen for deflecting the discharge therefrom into said depending trough to prevent interference with the discharge from said reciprocating trough.

6. In a conveyer system, a horizontally reciprocating screen terminating in a depending trough, a horizontally reciprocating trough arranged under said screen and extending into said first named trough, and an extension on said screen for deflecting the discharge therefrom into said depending trough to prevent interference with the discharge from said reciprocating trough.

7. In a conveyer system, a horizontally reciprocating screen terminating in a depending trough, a horizontally reciprocating trough arranged under said screen and extending into said first named trough, and an adjustable extension on said screen for deflecting the discharge therefrom into said depending trough to prevent interference with the discharge from said reciprocating screen.

8. In a conveyer system, a horizontally reciprocating screen terminating in a depending trough, a horizontally reciprocating trough arranged under said screen and extending into said first named trough, an adjustable extension on said screen for deflecting the discharge therefrom into said depending trough to prevent interference with the discharge from said reciprocating screen, and means for securing said adjustable extension in selected position.

9. In a conveyer system, a reciprocating screen terminating in a depending trough, said trough being equipped with an inclined bottom, a reciprocating trough arranged under said screen and terminating above said inclined bottom, and means for deflecting the discharge from said screen into said depending trough to prevent interference with the discharge from said reciprocating trough.

In witness whereof, I have hereunto subscribed my name this 23rd day of May, 1921.

RICHARD S. JACOBSEN.